(12) United States Patent
Koji (10) Patent No.: US 11,340,068 B2
(45) Date of Patent: May 24, 2022

(54) SCANNING RANGE SETTING METHOD AND SURVEY SYSTEM FOR THE METHOD

(71) Applicant: TOPCON CORPORATION, Tokyo (JP)

(72) Inventor: Tetsutaro Koji, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 717 days.

(21) Appl. No.: 16/123,676

(22) Filed: Sep. 6, 2018

(65) Prior Publication Data

US 2019/0101389 A1 Apr. 4, 2019

(30) Foreign Application Priority Data

Sep. 29, 2017 (JP) .............................. JP2017-191218

(51) Int. Cl.
*G01C 15/00* (2006.01)
*G01S 7/51* (2006.01)
*G01C 11/02* (2006.01)
*G01S 7/481* (2006.01)
*G01S 17/42* (2006.01)
*G01S 17/86* (2020.01)

(52) U.S. Cl.
CPC .......... *G01C 15/002* (2013.01); *G01C 11/025* (2013.01); *G01S 7/4817* (2013.01); *G01S 7/51* (2013.01); *G01S 17/42* (2013.01); *G01S 17/86* (2020.01)

(58) Field of Classification Search
CPC ........ G01S 17/89; G01S 17/42; G01S 7/4817; G01S 17/86; G01S 7/51; G01C 15/00; G01C 15/002; G01C 11/025; G01B 11/24
See application file for complete search history.

(56) References Cited

U.S. PATENT DOCUMENTS

| | | | |
|---|---|---|---|
| 2009/0241358 A1 | 10/2009 | Ohtomo et al. | |
| 2010/0026982 A1* | 2/2010 | Kludas | G01C 15/00 356/4.01 |
| 2015/0098075 A1* | 4/2015 | Bestler | G01C 15/002 356/3.01 |

FOREIGN PATENT DOCUMENTS

| | | |
|---|---|---|
| EP | 1906141 A2 | 4/2008 |
| EP | 3062066 A1 | 8/2016 |
| JP | 4607095 B2 | 1/2011 |
| JP | 5057734 B2 | 10/2012 |

* cited by examiner

*Primary Examiner* — Luke D Ratcliffe
(74) *Attorney, Agent, or Firm* — Roberts Calderon Safran & Cole P.C.

(57) ABSTRACT

Provided is a scanning range setting method using a surveying instrument configured to measure a distance to a measurement point by using a distance measuring light and measure an angle to the measurement point, and a scanner configured to scan with a scanning light around a rotation axis to acquire three-dimensional point group data. The method includes steps of: (A) measuring a distance to one or more measurement points by the surveying instrument, (B) storing coordinates and angles of the measurement points, (C) automatically setting an area including all of the measurement points as a scanning range by the scanner, and (D) scanning the scanning range by the scanner, wherein a coordinate system of the scanner and a coordinate system of the surveying instrument match each other.

9 Claims, 12 Drawing Sheets

SCANNING RANGE SETTING METHOD AND SURVEY SYSTEM FOR THE METHOD

CROSS-REFERENCE TO RELATED APPLICATIONS

The present application claims priority under 35 U.S.C. § 119 to Japanese Patent Application No. 2017-191218, filed Sep. 29, 2017. The contents of this application are incorporated herein by reference in their entirety

TECHNICAL FIELD

The present disclosure relates to a scanning range setting method of a laser scanner configured to acquire three-dimensional data of a survey site.

BACKGROUND ART

As a device capable of measuring three-dimensional data of a survey site, a laser scanner is known. A laser scanner scans a pulsed laser over a set measurement area to acquire three-dimensional point group data of pulsed laser irradiation points (for example, Patent Literature 1).

Setting of a measurement area of a laser scanner, that is, setting of a scanning range is conventionally performed by the following method:
(1) manually setting by a measurement operator by using a peep sight, or
(2) setting by a measurement operator on a display unit of a laser scanner equipped with a camera by displaying a camera image on the display unit of the scanner (for example, Patent Literature 2).

CITATION LIST

Patent Literatures

[Patent Literature 1] Specification of Japanese Patent No. 5057734
[Patent Literature 2] Specification of Japanese Patent No. 4607095

SUMMARY OF THE INVENTION

Technical Problem

As described above, a scanning range is manually set by a person. However, it is known that setting of a scanning range of a laser scanner is difficult. If setting of a scanning range is incorrect, the scanning range is not associated with measured three-dimensional data, and a mismatch point will occur in a three-dimensional model.

On the other hand, when creating a highly accurate three-dimensional model from three-dimensional point group data acquired by a laser scanner, coordinate data of measurement points which are obtained through accurate measurement performed by a surveying instrument are required. The measurement points are necessarily present within a scanning range.

Therefore, the inventor considered that by automatically setting a scanning range by using coordinate data of measurement points measured by a surveying instrument, setting of a scanning range could be easily and preferably performed, and proposed the present invention.

Thus, an object of the present invention is to provide a scanning range setting method to enable easy and preferable setting of a scanning range, and a survey system for the method.

Solution to Problem

In order to achieve the above-described object, a scanning range setting method according to an aspect of the present invention is a scanning range setting method that uses a surveying instrument configured to measure a distance to a measurement point by using a distance measuring light and measure an angle to the measurement point, and a scanner configured to scan a scanning light around a rotation axis to acquire three-dimensional point group data, and includes steps of: (A) measuring a distance to one or more measurement points by the surveying instrument, (B) storing coordinates and angles of the measurement points, (C) automatically setting an area including all of the measurement points as a scanning range by the scanner, and (D) scanning the scanning range by the scanner, wherein a coordinate system of the scanner and a coordinate system of the surveying instrument match each other.

In the aspect described above, it is also preferable that the scanning range setting method further include, in the step (C), a step (c) of setting the scanning range as an enlarged scanning range by enlarging the scanning range by a predetermined range.

In the aspect described above, it is also preferable that the scanning range setting method further include, after the step (D), a step (E) of merging coordinate data of the measurement points acquired by the surveying instrument and the three-dimensional point group data acquired by the scanner.

In the aspect described above, it is also preferable that the scanning range setting method further includes, after the step (C), a step of displaying the scanning range superimposed on a landscape image acquired by using a camera.

A survey system according to another aspect of the present invention includes a surveying instrument configured to measure a distance to one or more measurement points by using a distance measuring light and measure angles to the measurement points, and a scanner configured to scan a scanning light around a rotation axis to acquire three-dimensional point group data, wherein the scanner includes a data storage unit configured to store coordinates and angles of the measurement points, and is configured to, automatically set an area including all of the measurement points as a scanning range, based on the coordinates and angles of the measurement points stored.

In the aspect described above, it is also preferable that the survey system includes a camera configured to photograph a landscape image including the measurement points, the surveying instrument include a display unit configured to display the coordinates of the measurement points and the landscape image, and the display unit is configured to display the scanning range by superimposing the scanning range on the landscape image.

Effect of the Invention

According to the aspects described above, a scanning range can be easily and preferably set.

DESCRIPTION OF EMBODIMENTS

Hereinafter, preferred embodiments of the present invention are described with reference to the drawings, however, the present invention is not limited to these embodiments. In the embodiments, a common configuration is designated by the same reference signs, and detailed description of the common configuration is omitted.

First Embodiment

Figure 1:
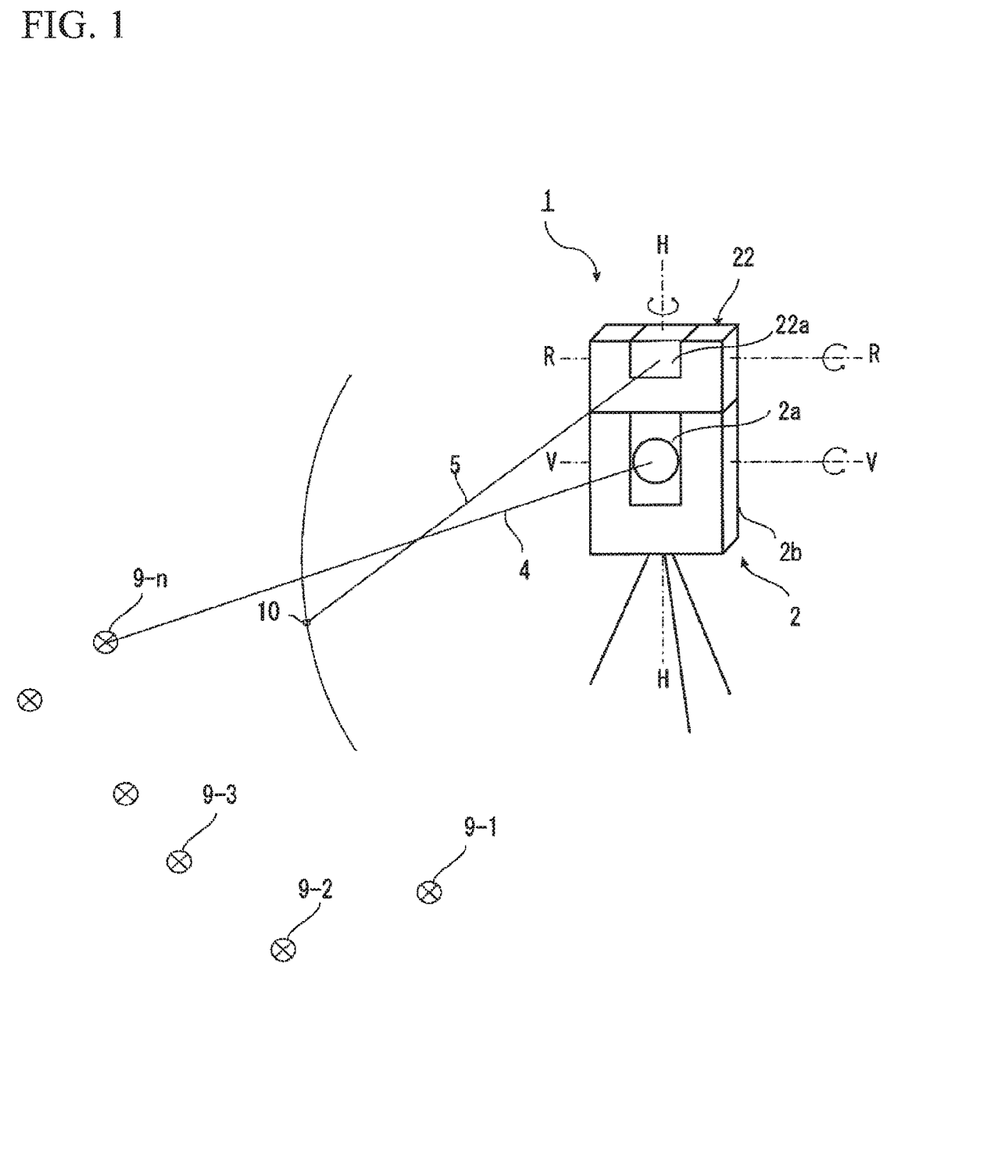
FIG. 1 is a schematic view illustrating an external configuration of a survey system according to a first embodiment of the present invention.

FIG. 1 is a schematic view illustrating an external configuration of a survey system 1 according to a first embodiment of the present invention. The survey system 1 includes a surveying instrument 2 and a scanner 22. The surveying instrument 2 and the scanner 22 are integrated and have a mechanical positional relationship being known, and are configured so that their coordinate systems match each other. In detail, in processing of data of the surveying instrument 2 and the scanner 22, correction coefficients are set so that the coordinate systems match each other.

The surveying instrument 2 is a so-called motor drive total station, and is installed at a known point by using a tripod. The surveying instrument 2 includes, in order from the lower side, a leveling section, a base section provided on the leveling section, a housing 2b that rotates around a horizontal rotation axis H-H on the base section, and a telescope 2a that rotates around a vertical rotation axis V-V at the center of the housing 2b.

The reference signs 9-1, 9-2, 9-3, . . . , 9-n denote measurement points at each of which a target (prism or reflection sheet) is set. In the following description, a measurement point whose position is not specified is designated by a reference sign 9-n.

Figure 2:
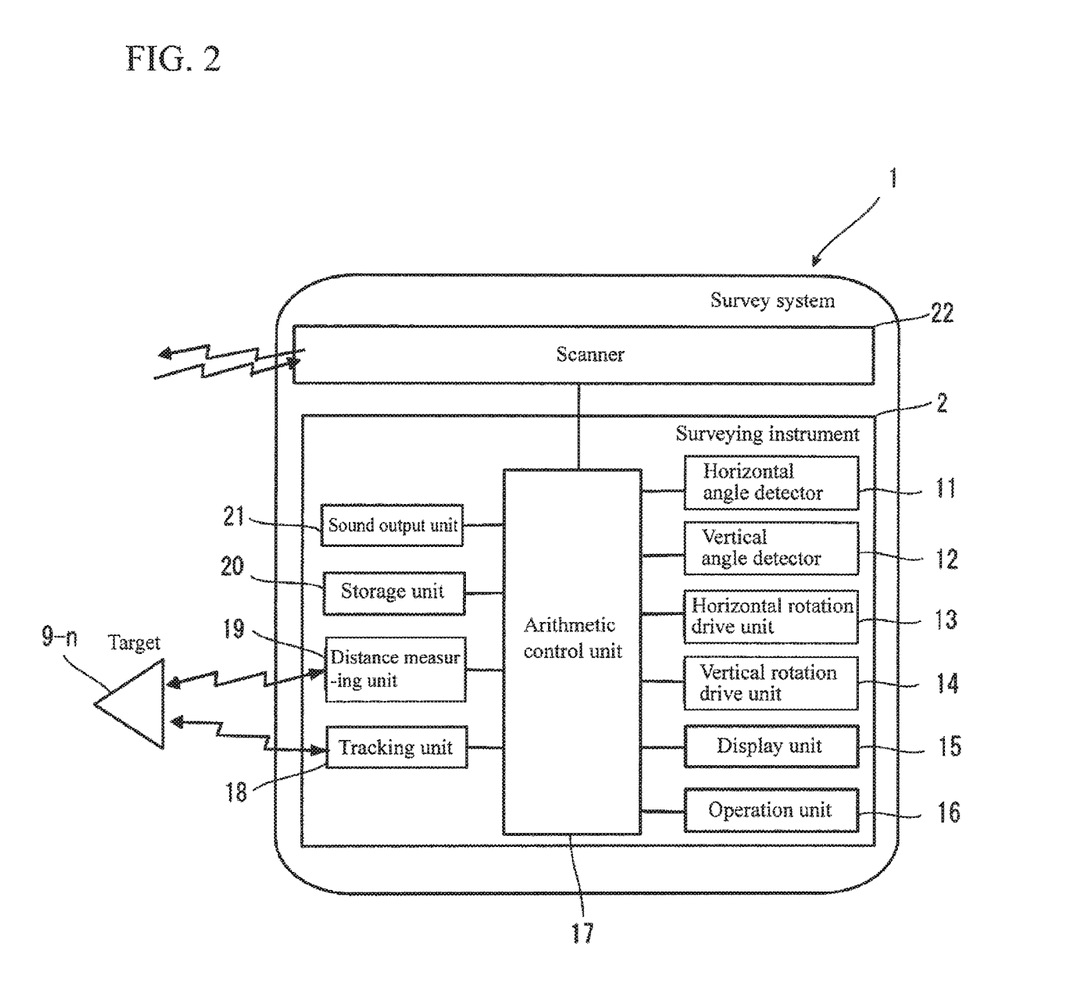
FIG. 2 is a configuration block diagram of the survey system according to the same embodiment.

FIG. 2 is a configuration block diagram of the survey system 1. The survey system 1 includes a horizontal angle detector 11, a vertical angle detector 12, a horizontal rotation drive unit 13, a vertical rotation drive unit 14, a display unit 15, an operation unit 16, an arithmetic control unit 17, a tracking unit 18, a distance measuring unit 19, a storage unit 20, a sound output unit 21, and a scanner 22.

The horizontal rotation drive unit 13 and the vertical rotation drive unit 14 are motors, and are controlled by the arithmetic control unit 17 and respectively drive the rotation about the horizontal rotation axis H-H and the rotation about the vertical rotation axis V-V. In the surveying instrument 2, by collaboration of horizontal rotation of the housing 2b and vertical rotation of the telescope 2a, a distance measuring light is emitted from the telescope 2a.

The horizontal angle detector 11 and the vertical angle detector 12 are rotary encoders each including a rotary disk, slits, a light emitting diode, and an image sensor. The horizontal angle detector 11 is provided for the horizontal rotation axis H-H (FIG. 1) and detects a rotation angle in the horizontal direction of the housing 2b. The vertical angle detector 12 is provided for the vertical rotation axis V-V (FIG. 1) and detects a rotation angle in the vertical direction of the telescope 2a.

The display unit 15 and the operation unit 16 are interfaces of the survey system 1. Via the display unit 15 and the operation unit 16, a user can perform a command and setting of a survey operation and confirmation of measurement results, etc., of the surveying instrument 2 and the scanner 22.

The distance measuring unit 19 transmits an infrared pulsed laser light as a distance measuring light to a measurement point 9-n. Then, a reflected light from the measurement point 9-n is received by a light receiving unit, for example, a photodiode, etc., and converted into a distance measurement signal. The reference sign 4 in FIG. 1 denotes an optical axis of the distance measuring light.

The tracking unit 18 transmits, as a tracking light, an infrared laser light with a wavelength different from that of the distance measuring light. By a light receiving unit such as an image sensor, a landscape image including the tracking light and a landscape image excluding the tracking light are acquired. The arithmetic control unit 17 detects a position of the measurement point 9-n from a difference between the images, and performs automatic tracking so that the telescope 2a always faces a direction of the measurement point 9-n.

The arithmetic control unit 17 is, for example, a microcontroller including a CPU, a ROM, and a RAM, etc., mounted on an integrated circuit, and controls the rotation drive units 13 and 14, performs automatic tracking by the tracking unit 18, and performs automatic collimation by comparing outputs of distance measurement signals.

In addition, the arithmetic control unit 17 measures a distance to each of the measurement points 9-1, 9-2, 9-3, . . . , 9-n based on the number of light wave oscillations from light transmission to light reception, and from values detected by the horizontal angle detector 11 and the vertical angle detector 12, measures an angle to each of the measurement points 9-1, 9-2, 9-3, . . . , 9-n, and measures an X coordinate, a Y coordinate, and a Z coordinate of each measurement point.

The storage unit 20 is, for example, a hard disk drive. In the storage unit 20, a program for the arithmetic control described above is stored.

The sound output unit 21 is a speaker, and outputs a sound based on a command from the arithmetic control unit 17.

Figure 3:
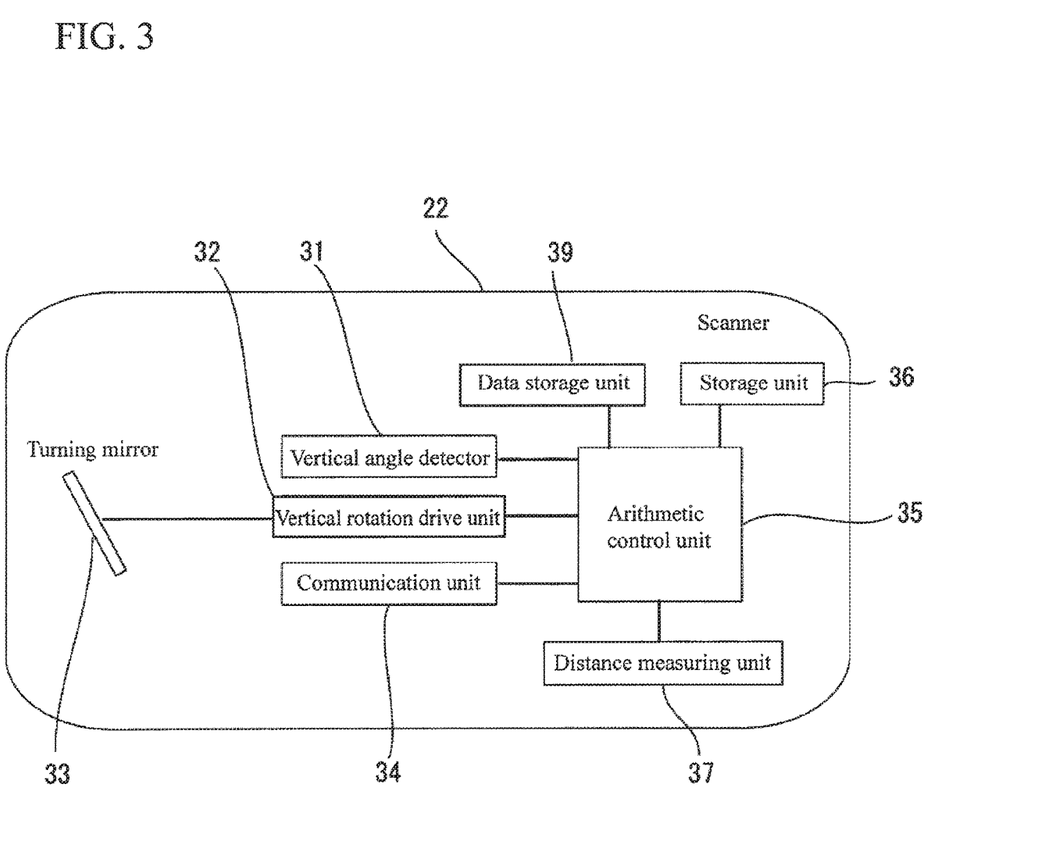
FIG. 3 is a configuration block diagram of a scanner according to the same embodiment.

The scanner 22 is a three-dimensional laser scanner. FIG. 3 is a configuration block diagram of the scanner 22 according to the embodiment. The scanner 22 includes a vertical angle detector 31, a vertical rotation drive unit 32, a turning mirror 33, a communication unit 34, an arithmetic control unit 35, a storage unit 36, a distance measuring unit 37, and a data storage unit 39.

The turning mirror 33 is driven by the vertical rotation drive unit 32 to turn around the vertical rotation axis R-R (FIG. 1) via a lens barrel not illustrated. The turning mirror 33 is also disposed on the horizontal rotation axis H-H of the surveying instrument 2 via a housing 22a (FIG. 1) of the scanner 22, and the housing 22a of the scanner 22 and the housing 2b of the surveying instrument 2 integrally rotate horizontally.

The distance measuring unit 37 scans vertically an infrared pulsed laser light as a scanning light toward a measuring target by using the turning mirror 33. Then, a reflected light of the infrared pulsed laser light is received by a light receiving unit, for example, a photodiode, etc. The reference sign 5 in FIG. 1 denotes an optical axis of a scanning light of the scanner 22 at a certain point in time. The reference sign 10 denotes an irradiation point (measurement position) at that point in time.

The vertical angle detector 31 is an encoder, and detects a vertical rotation angle of the turning mirror 33.

The arithmetic control unit 35 is a microcontroller, and is electrically connected to the arithmetic control unit 17 of the surveying instrument 2. The arithmetic control unit 35 scans with a scanning light via the turning mirror 33 by controlling the vertical rotation drive unit 32. The arithmetic control unit 35 turns the turning mirror 33 by controlling the vertical rotation drive unit 32, and scans with a pulsed laser in the vertical direction and the horizontal direction by driving the horizontal rotation drive unit 13.

In addition, the arithmetic control unit 35 automatically sets an area including all of the measurement points as a scanning range based on measurement point data stored in the data storage 39 unit.

In addition, the arithmetic control unit 35 obtains a distance to the irradiation point 10 by measuring a round-trip time of the laser pulse. Also, the arithmetic control unit 35 measures, from values detected by the vertical angle detector 31 of the scanner and the horizontal angle detector 11 of the surveying instrument 2, an angle to each irradiation point 10. Then, the arithmetic control unit 35 obtains three-dimensional point group data from distances, horizontal angles, and vertical angles to the irradiation points 10.

In addition, the arithmetic control unit 35 controls communication of the communication unit 34. The arithmetic control unit 35 receives a specification of a searching range and a scanning start command from the operation unit 16 of the surveying instrument 2.

The storage unit 36 is, for example, a hard disk drive, and in the storage unit 36, a program for the arithmetic control described above is stored.

The data storage unit 39 is, for example, an SD card, and in the data storage unit, acquired point group data and image data are stored. In addition, data concerning measurement points acquired by the surveying instrument 2 are stored.

In the survey system 1, the horizontal angle detector 11, the vertical angle detector 12, the horizontal rotation drive unit 13, the vertical rotation drive unit 14, the arithmetic control unit 17, the storage unit 20, and the sound output unit 21 are housed in the housing 2b of the surveying instrument 2, and the display unit 15 and the operation unit 16 are provided outside the housing 2b. The tracking unit 18 and the distance measuring unit 19 are housed in the telescope 2a of the surveying instrument 2.

The scanner 22 is, for example, as illustrated in FIG. 1, fixed to and integrated with an upper portion of the telescope 2a of the surveying instrument 2. In addition, the scanner 22 may be disposed at a lower portion or side portion of the telescope 2a, or under the display unit 15. The scanner 22 does not necessarily have to be integrated, and may be separately provided as long as its coordinate system matches the coordinate system of the surveying instrument.

Setting of Scanning Range

Figure 4:
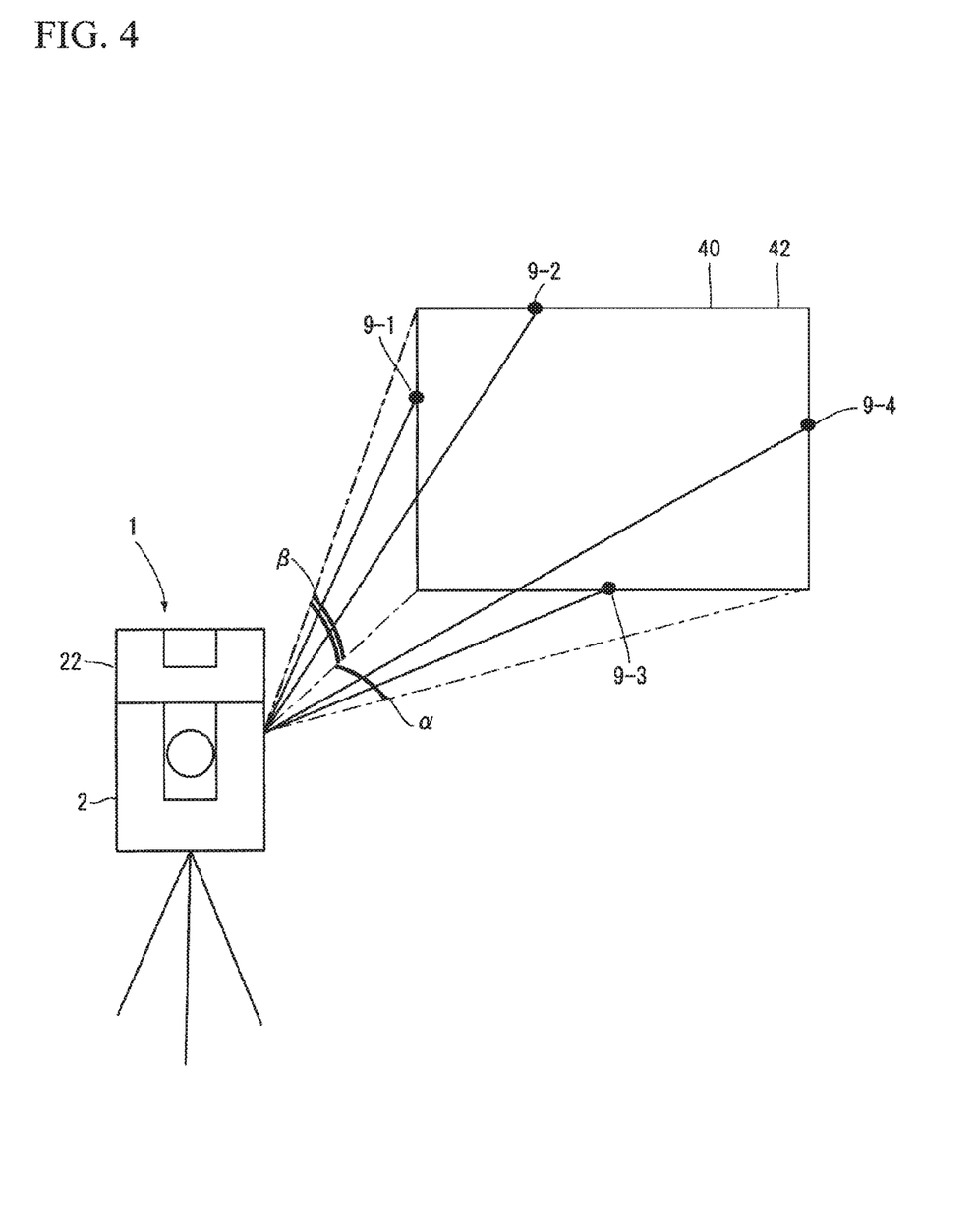
FIG. 4 is a schematic view to describe a scanning range setting method according to the same embodiment.
Figure 5:
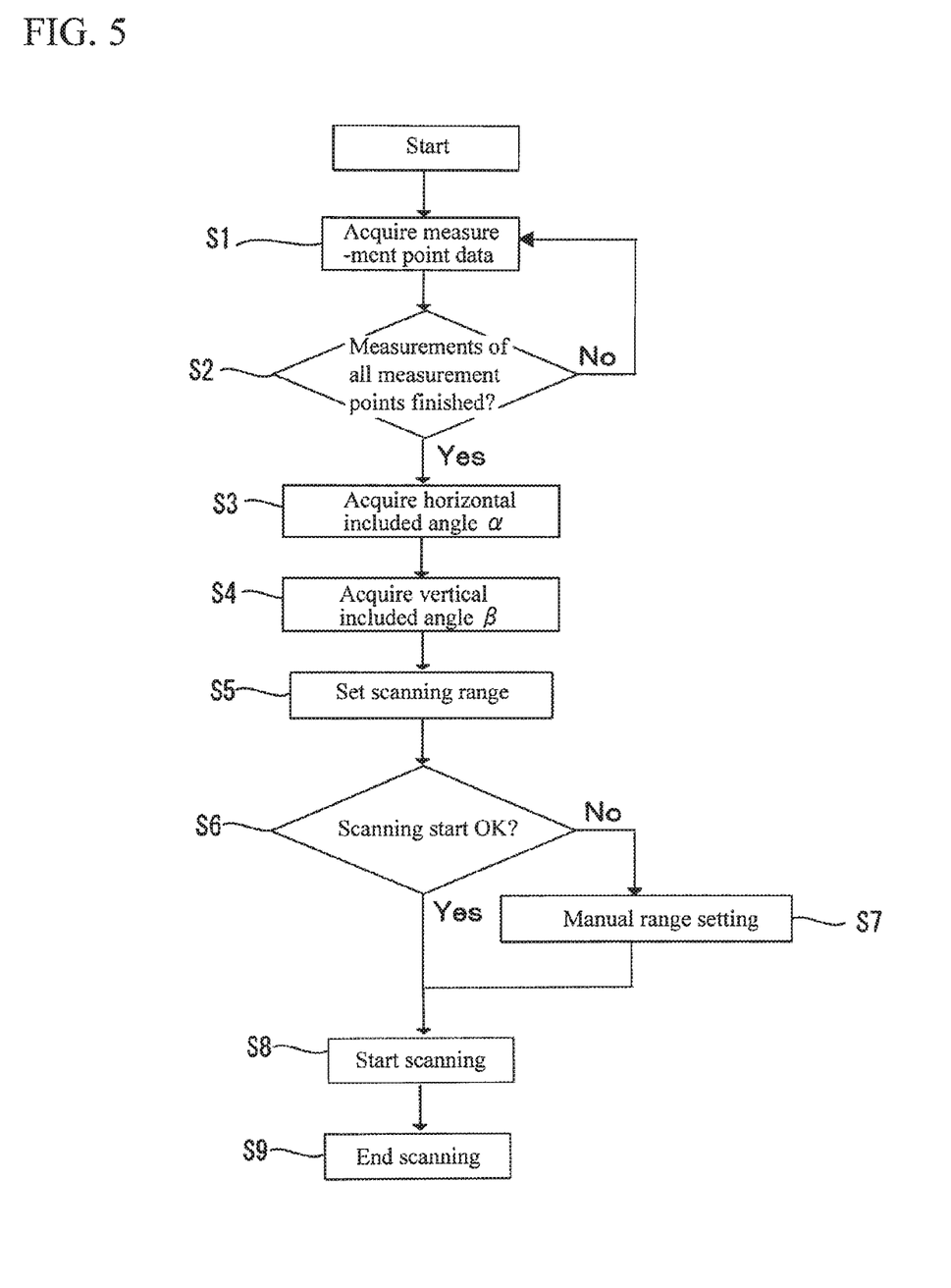
FIG. 5 is a flowchart of a scanning operation using the survey system according to the same embodiment.

Next, a scanning range setting method is described. FIG. 4 is a schematic view to describe setting of a scanning range based on four measurement points, and FIG. 5 is a flowchart of a scanning operation using the survey system 1 according to the present embodiment.

First, when a start of scanning range setting is commanded from the operation unit 16, the process shifts to Step S1, and the surveying instrument 2 acquires measurement point data. As acquisition of measurement point data, a user collimates a target set at the measurement point 9-1 that the user desires to accurately measure, and manually measures a horizontal angle, a vertical angle, and a distance to the measurement point by the surveying instrument 2.

When the measurement of the one measurement point 9-1 is finished, the process shifts to Step S2, and the surveying instrument 2 confirms with the user whether measurements of all measurement points have been finished via the display unit. In a case where the user's answer is "No," the process returns to Step S1, and the surveying instrument measures a horizontal angle, a vertical angle, and a distance to the next measurement point 9-2, and repeats this operation until measurements of all measurement points are finished. In a case where the user's answer is "Yes," measurements of the measurement points are ended, and coordinates and angles of the measurement points are stored in the data storage unit 39 of the scanner 22, and the process shifts to Step S3.

In Step S3, from the coordinates of the measurement points 9-1 to 9-4 measured in Step S2, the arithmetic control unit 17 of the surveying instrument 2 extracts two points 9-1 and 9-4 that are most distant from each other in the horizontal direction, and acquires a horizontal included angle α of these and outputs this angle to the scanner 22. The data storage unit 39 of the scanner 22 stores this.

Next, when the process shifts to Step S4, from the coordinates of the measurement points 9-1 and 9-4 measured in Step S2, the arithmetic control unit 17 of the surveying instrument 2 extracts two points 9-2 and 9-3 most distant from each other in the vertical direction, and acquires a vertical included angle β of these, and stores this angle in the data storage unit 39 of the scanner 22.

Next, when the process shifts to Step S5, the arithmetic control unit 35 of the scanner 22 automatically sets a scanning range 40 based on the coordinates, the horizontal included angle α, and the vertical included angle β of the measurement points stored in the data storage unit 39.

In detail, for example, in the horizontal direction, a range of the horizontal included angle α spreading rightward from the measurement point 9-1 located leftmost (that is, at the left end of the area 42 including all measurement points), and in the vertical direction, a range of the vertical included angle β spreading downward from the measurement point 9-2 located uppermost (that is, at the upper end of the area 42), are set as the scanning range 40. This setting of the scanning range 40 is stored in the data storage unit 39 of the scanner 22.

When the horizontal included angle α is in a range of $180° \leq \alpha \leq 360°$, the scanning range 40 in the horizontal direction is set so that 180° rotational scanning is performed. A reason for this is described below.

When the scanning range 40 is set, the process shifts to Step S6. The arithmetic control unit 35 performs, on the display unit 15, a display to confirm with the user whether to start scanning of the set range 40. When the user's answer is "Yes," the setting of the scanning range 40 is confirmed, and the process shifts to Step S8, and scanning is started. When the user's answer is "No," the process shifts to Step S7. The user manually sets a scanning range, and this setting is decided and the process shifts to Step S8, and the scanner 22 starts scanning.

Scanning in the horizontal direction is performed based on the set scanning range 40. On the other hand, in the vertical direction, regardless of the set scanning range 40, scanning of 270° including the vertex is performed.

As described above, in Step S5, the reason for setting the scanning range 40 to 180° in the horizontal direction when the horizontal included angle α is in a range of 180°≤α≤360° is that scanning of 270° including the vertex in the vertical direction plus scanning of 180° in the horizontal direction is scanning as much as whole circumference scanning in the horizontal direction, and scanning over 180° in the horizontal direction is not necessary. This is because setting of a scanning range is performed for the purpose of shortening a scanning time.

When scanning of the set scanning range is completed, the process shifts to Step S9, and the arithmetic control unit 35 ends scanning, and the data storage unit 39 stores obtained point group data.

Three-Dimensional Model Creation

Figure 6:
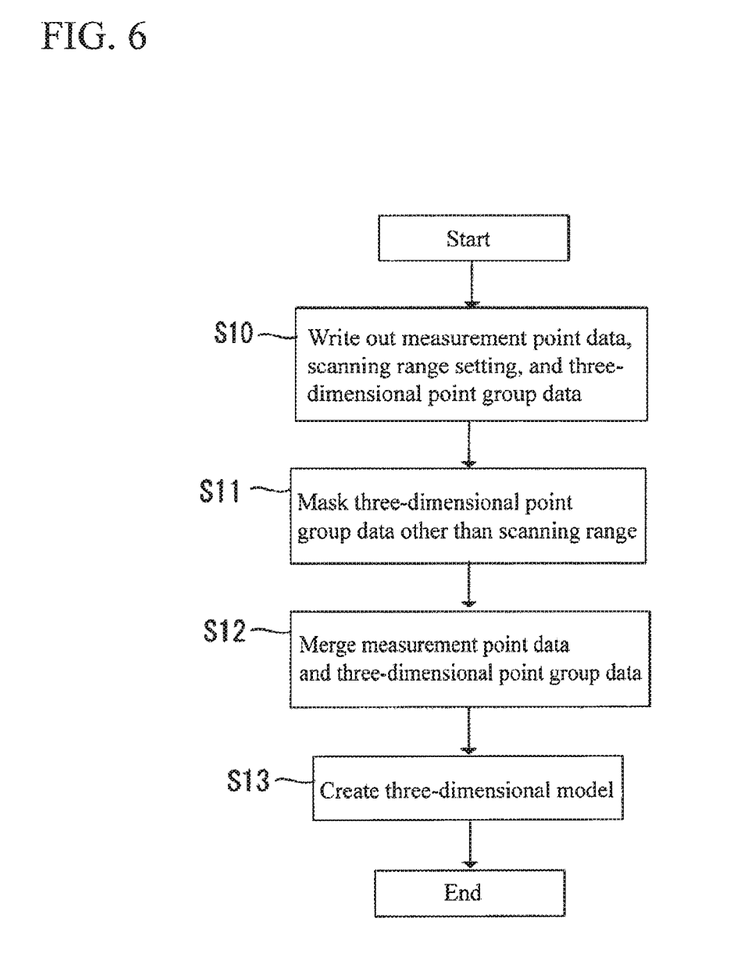
FIG. 6 is a flowchart of three-dimensional model creation using the survey system according to the same embodiment.

Next, a method of creating a three-dimensional model by using the survey system 1 according to the present embodiment is described with reference to FIG. 6. This operation is performed after the above-described scanning operation is ended. This operation may be performed by using an external terminal.

Although not illustrated, the external terminal is a terminal, for example, a personal computer, a tablet, etc., and includes a control unit such as a CPU, a storage unit such as a hard disk drive, a display unit such as a liquid crystal display, and an input unit such as a keyboard and a touch display.

First, the process shifts to Step S10, and the data of measurement points acquired in Step S1, the setting of a scanning range 40 acquired in Step S5, and the three-dimensional point group data acquired in Step S8 are written out from the data storage unit 39 of the scanner to the storage unit of the external terminal.

Next, the process shifts to Step S11, and by using dedicated application software, a portion other than the scanning range 40 in the three-dimensional point group data is masked.

Next, the process shifts to Step S12, and the masked three-dimensional point group data and coordinate data of the measurement points are merged, and then, the process shifts to Step S13, and a three-dimensional model is created.

Creation of a three-dimensional model is thus completed.

In the present embodiment, a necessary scanning range can be automatically and accurately set based on data of measurement points, so that setting of a scanning range generally considered as being difficult can be easily and preferably performed. In addition, scanning range setting uses accurate data of the measurement points for creation of a three-dimensional model, so that it is not required to perform a separate operation for scanning range setting. As a result, the process from setting of a scanning range to creation of a three-dimensional model becomes easy.

Second Embodiment

A mechanical configuration of a survey system 101 according to a second embodiment is the same as that of the survey system 1 according to the first embodiment, but is different in that a scanning range to be set includes an enlarged scanning range obtained by enlarging an area including all measurement points set in the first embodiment.

Setting of Scanning Range

Figure 7:
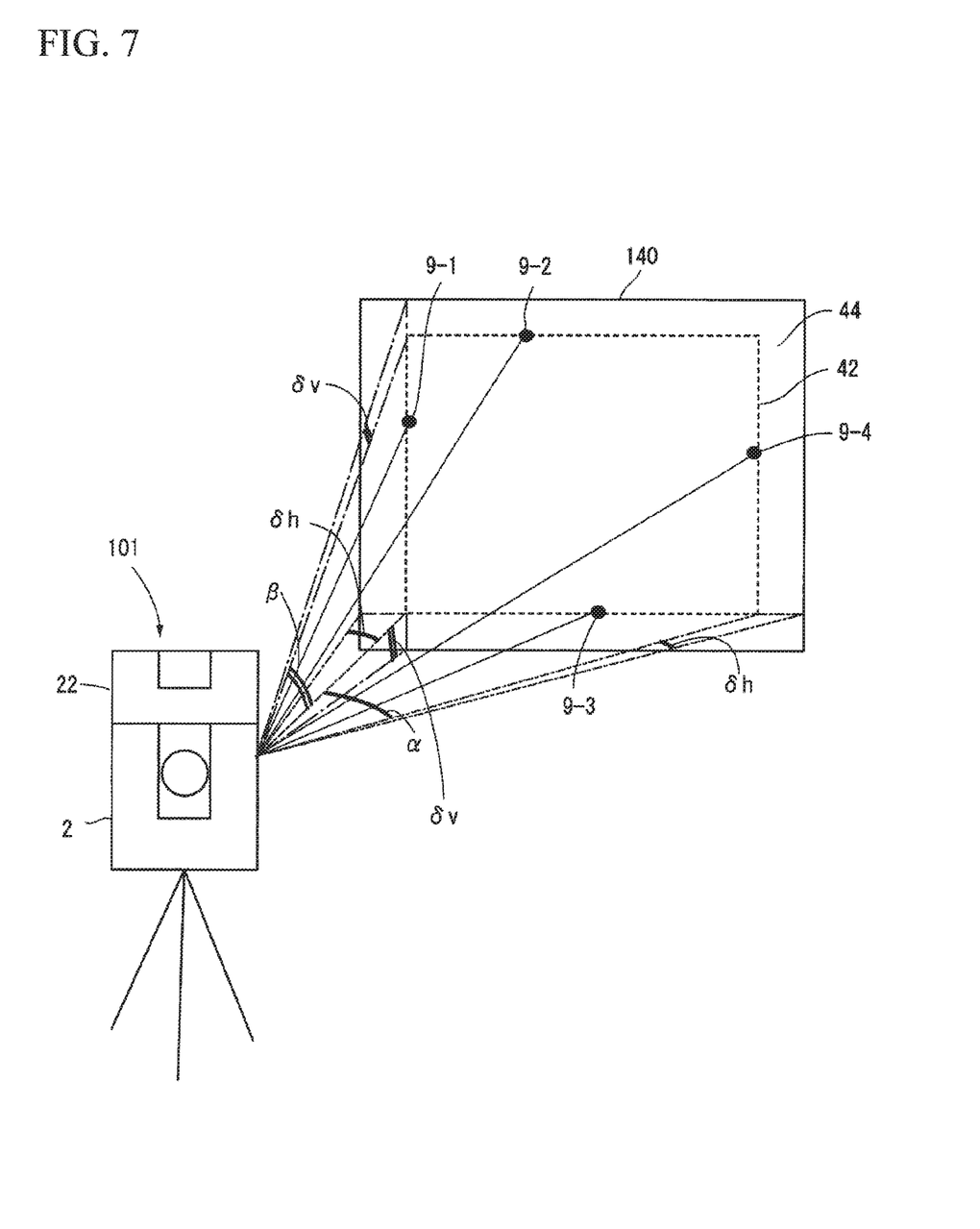
FIG. 7 is a schematic view to describe a scanning range setting method using a survey system according to a second embodiment of the present invention.
Figure 8:
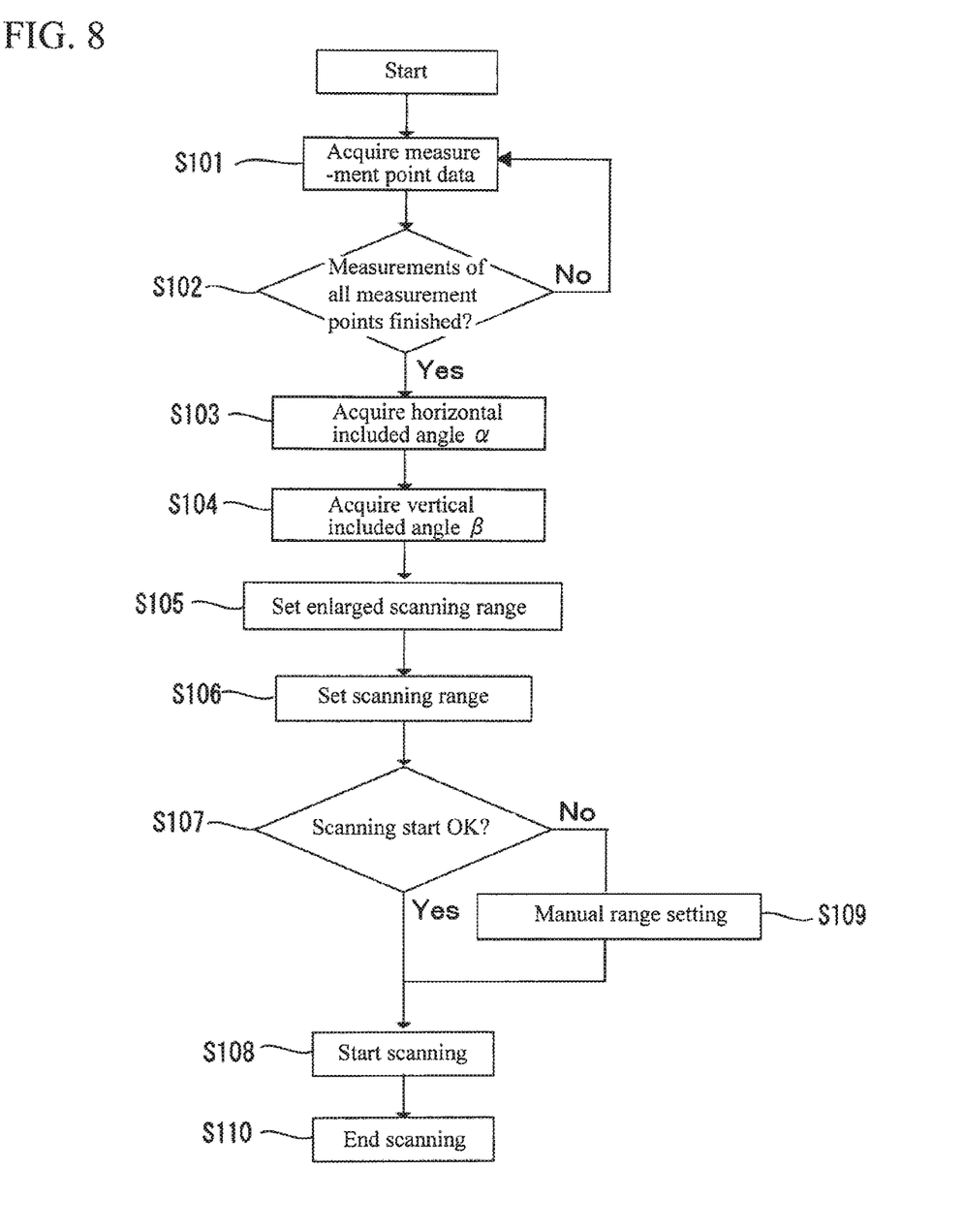
FIG. 8 is a flowchart of a scanning operation using the survey system according to the same embodiment.

A scanning range setting method according to the second embodiment is described with reference to the drawings. FIG. 7 is a schematic view to describe setting of a scanning range based on the same four measurement points as in FIG. 4, and FIG. 8 is a flowchart of a scanning operation using the survey system 101 according to the present embodiment.

First, when a start of scanning range setting is commanded from the operation unit 16, the process shifts to Step S101, and the surveying instrument 2 acquires measurement point data in the same manner as in Step S1. That is, a user manually measures a measurement point by the surveying instrument 2.

When the measurement of the measurement point is finished, the process shifts to Step S102, and the arithmetic control unit performs a display to confirm with the user whether measurements of all required measurement points have been finished on the display unit. When the user's answer is "No," the process returns to Step S101, and this operation is repeated until measurements of all measurement points are finished. When the user's answer is "Yes," measurements of the measurement points are ended, and coordinates and angles of the measurement points are stored in the data storage unit 39 of the scanner 22, and the process shifts to Step S103.

When the process shifts to Step S103, in the same manner as in Step S3, the arithmetic control unit 17 extracts two measurement points 9-1 and 9-4 most distant from each other in the horizontal direction, and acquires a horizontal included angle α of these. The data on the measurement points and the horizontal included angle α are stored in the data storage unit 39 of the scanner 22. When the number of measurement points is one, the horizontal included angle α is 0.

Next, when the process shifts to Step S104, in the same manner as in Step S4, the arithmetic control unit 17 extracts two points 9-2 and 9-3 most distant from each other in the vertical direction, and acquires a vertical included angle β of these. The data on the vertical included angle β is stored in the data storage unit 39 of the scanner 22. When the number of measurement points is one, the vertical included angle β is 0.

Next, when the process shifts to Step S105, the arithmetic control unit 35 sets an enlarged scanning range 44 enlarged by a predetermined angle outward from the area 42 including all measurement points.

In detail, for example, as illustrated in FIG. 7, the enlarged scanning range 44 in the horizontal direction is a range of an angle δh leftward in the horizontal direction from the measurement point 9-1 located at the left end of the area 42 including all measurement points and of an angle δh rightward in the horizontal direction from the measurement point 9-4 located at the right end of the area 42. The enlarged scanning range 44 in the vertical direction is a range of an angle δv in the vertical direction from the measurement point 9-2 located at the upper end of the area 42 including all measurement points and of an angle δv in the vertical direction from the measurement point 9-3 located at the lower end of the area 42. A size of the enlarged scanning range 44 can also be set by distances from measurement point coordinates as well as setting by angles as described above. In addition, the size of the enlarged scanning range can be set so as to be arbitrarily changeable by a user.

Next, when the process shifts to Step S106, the arithmetic control unit 35 sets a scanning range 140 so that the scanning range includes the area 42 including all measurement points and the enlarged scanning range 44 based on the measurement point data, the horizontal included angle $\alpha$, the vertical included angle $\beta$, and the enlarged scanning range 44 setting. That is, the scanning range 140 in the horizontal direction becomes a range enlarged by $\delta h$ to both left and right sides of the horizontal included angle $\alpha$, and the scanning range 140 in the vertical direction becomes a range enlarged by $\delta v$ to both upper and lower sides of the vertical included angle $\beta$. The setting of the scanning range 140 is stored in the data storage unit 39 of the scanner 22.

Next, when the process shifts to Step S107, by display on the display unit 15 of the surveying instrument 2, the arithmetic control unit 35 confirms with the user whether to start scanning based on the set scanning range 140. When the user's answer is "Yes," the scanning range 140 is decided confirmed, and the process shifts to Step S108, and scanning is started. When the user's answer is "No," the process shifts to Step S109, and the user manually sets a scanning range, and this scanning range is confirmed, and the process shifts to Step S108 and scanning is started.

When scanning of the set scanning range is completed in the same manner as in Step S8, the process shifts to Step S110, and the arithmetic control unit 35 ends scanning and stores obtained point group data in the storage unit 36.

At a survey site, not only information on measurement points desired to be measured but also information around the points are required in many cases. According to the present embodiment, the scanning range 140 can be automatically set so as to include the enlarged scanning range 44 at the outer side of the area 42 including all measurement points, so that a necessary region can be easily and accurately set as a scanning range.

Creation of Three-Dimensional Model

Figure 9:
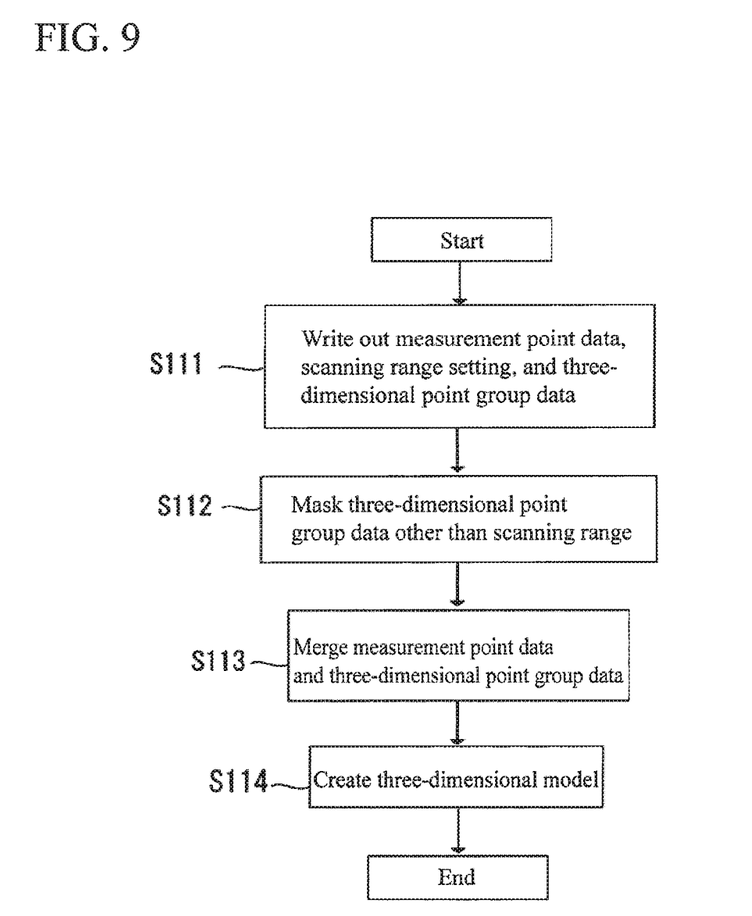
FIG. 9 is a flowchart of three-dimensional model creation using the survey system according to the same embodiment.

Next, a method of creating a three-dimensional model by using the survey system 101 according to the present embodiment is described with reference to FIG. 9. This operation is performed after the scanning operation described above is ended. This operation may be performed by using an external terminal as in the case of the first embodiment.

First, the process shifts to Step S111, and the data of the measurement points acquired in Step S101, the setting of the scanning range 140 acquired in Step S106, and the three-dimensional point group data acquired in Step S109 are written out from the data storage unit 39 of the scanner 22 to a storage unit of the external terminal.

Next, the process shifts to Step S112, and by using dedicated application software, a portion other than the scanning range 140 in the vertical direction in the three-dimensional point group data is masked.

Here, after masking of the three-dimensional point group data, the masked three-dimensional point group data may be re-displayed on the display unit of the external terminal so that the scanning range in the vertical direction can be arbitrarily reset by a user.

Next, the process shifts to Step S113, and the masked three-dimensional point group data and the coordinate data of the measurement points are merged, and the process shifts to Step S114, and a three-dimensional model is created.

Creation of the three-dimensional model is thus completed.

Third Embodiment

Figure 10:
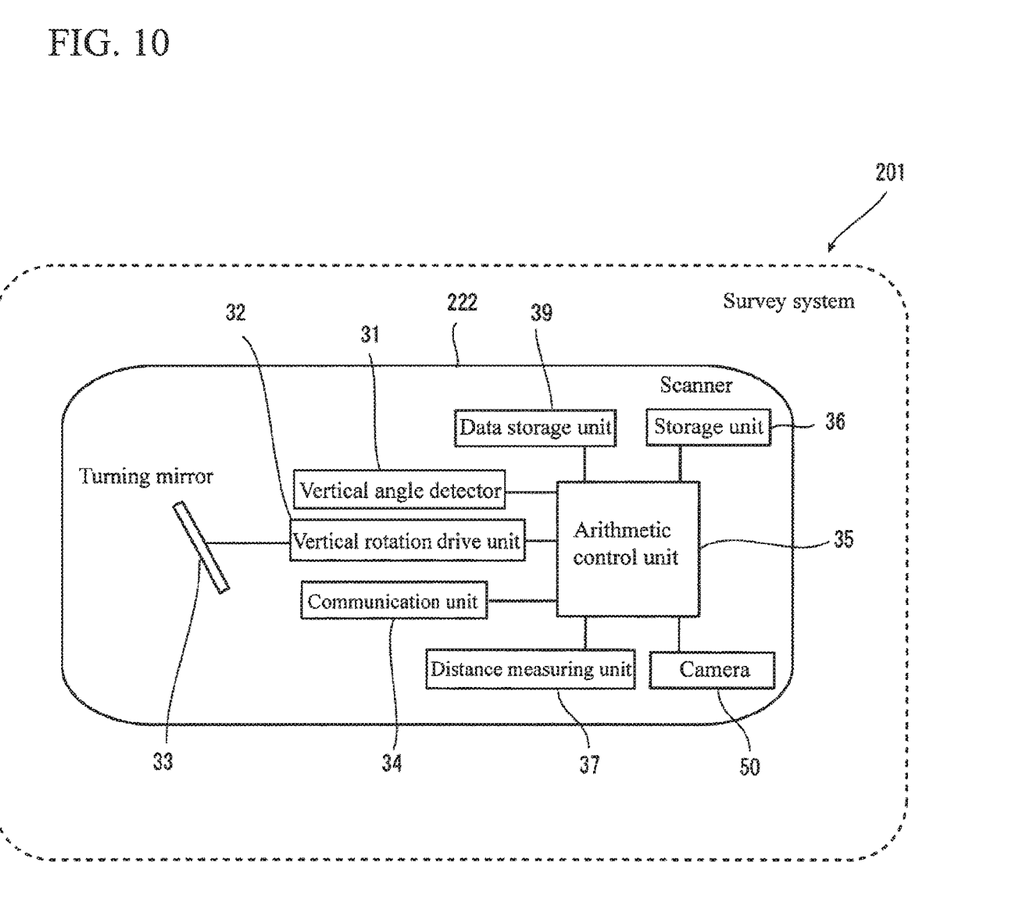
FIG. 10 is a configuration block diagram of a scanner relating to a survey system according to a third embodiment of the present invention.

FIG. 10 is a configuration block diagram of a scanner 222 included in a survey system 201 according to a third embodiment of the present invention. The survey system 201 of the present embodiment includes a surveying instrument 2 and a scanner 222 as with the first and second survey systems 1 and 101. The surveying instrument 2 has the same configuration, so that the surveying instrument 2 is omitted in FIG. 10. The scanner 222 includes a camera 50 in addition to the configuration of the scanner 22.

The camera 50 is, for example, a digital camera, and includes an image sensor such as a CCD or a CMOS sensor as an imaging element. Acquired image data is output as a digital signal, and can be acquired as a landscape image.

The camera 50 is connected to an arithmetic processing unit 35 of the scanner 222, and driving of the camera is controlled according to commands of the arithmetic control unit 17 of the surveying instrument 2 via communication between the scanner 222 and the surveying instrument 2. Acquired image data is stored in the storage unit 20 of the surveying instrument 2, and displayed on the display unit 15.

In the present embodiment, the camera 50 may be provided in the survey system 201 as a camera separate from the scanner 222.

Setting of Scanning Range

Figure 11:
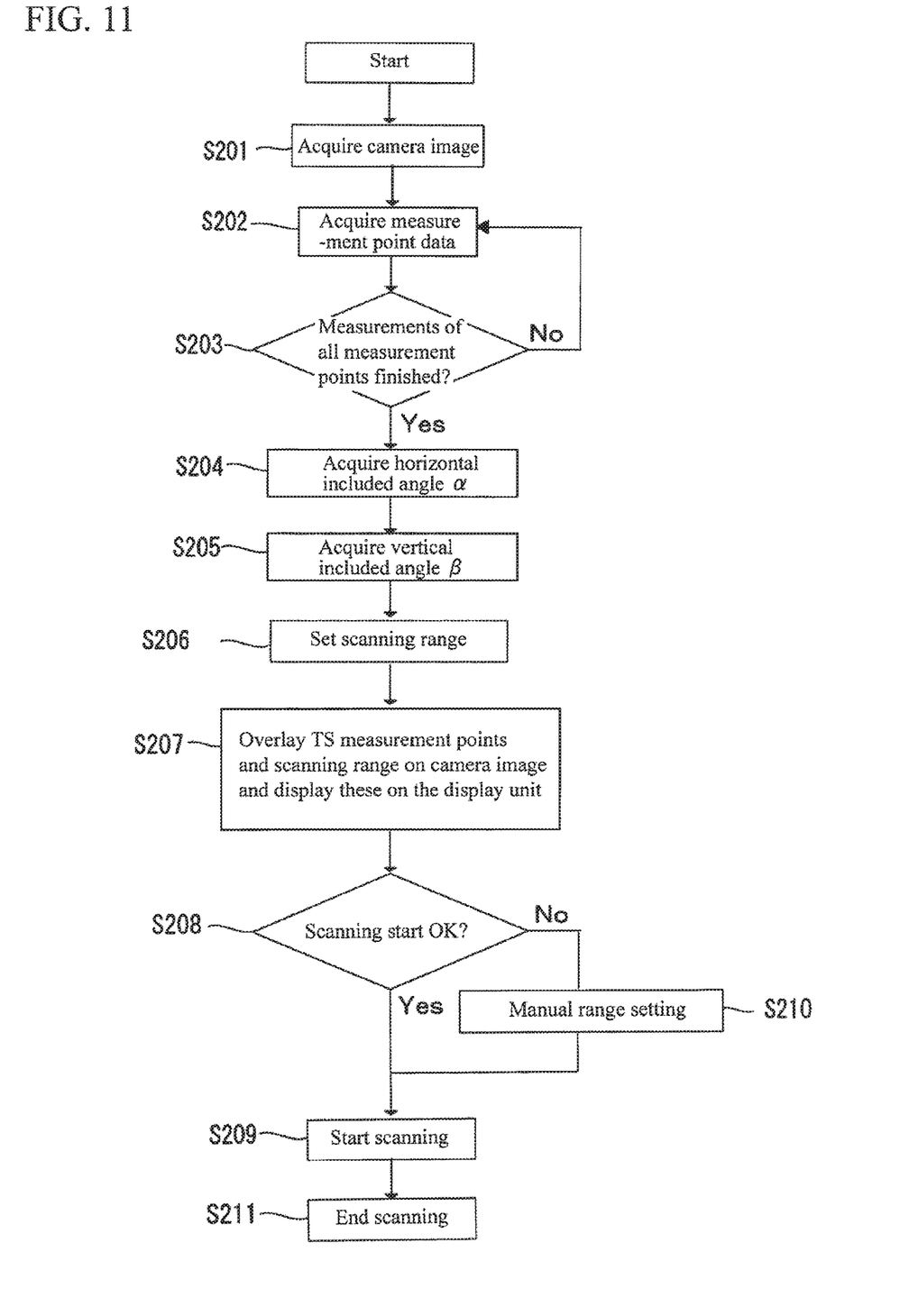
FIG. 11 is a flowchart of a scanning operation using the survey system according to the same embodiment.

A scanning range setting method according to the third embodiment is described. FIG. 11 is a flowchart of a scanning operation using a survey system 201 according to the present embodiment.

First, when a start of scanning is commanded from the operation unit 16, the process shifts to Step S201, and the camera 50 acquires a surrounding landscape image and stores it in the storage unit 20.

Next, when the process shifts to Step S202, in the same manner as in Step S1, the surveying instrument 2 acquires measurement point data.

When the measurement of the measurement point is finished, the process shifts to Step S203, and the arithmetic control unit 17 performs a display to confirm with a user whether measurements of all measurement points have been finished on the display unit 15. When the user's answer is "No," the process returns to Step S202, and this operation is repeated until measurements of all measurement points are finished. When the user's answer is "Yes," measurements of the measurement points are ended, and coordinates and angles of the measurement points are stored in the data storage unit 39 of the scanner 22, and the process shifts to Step S204.

When the process shifts to Step S204, in the same manner as in Step S3, the arithmetic control unit 17 extracts two measurement points most distant from each other in the horizontal direction, and acquires a horizontal included angle $\alpha$ of these. The data on the measurement points and the horizontal included angle $\beta$ are stored in the data storage unit 39 of the scanner 22.

Next, when the process shifts to Step S205, in the same manner as in Step S4, the arithmetic control unit 17 extracts two points most distant from each other in the vertical direction, and acquires a vertical included angle $\beta$ of these. The data on the vertical included angle $\beta$ is stored in the data storage unit 39 of the scanner 22.

Next, when the process shifts to Step S206, in the same manner as in Step S5, the arithmetic control unit 35 of the scanner 22 sets a scanning range based on the coordinates of the measurement points, the horizontal included angle α, and the vertical included angle β stored in the data storage unit 39.

Next, when the process shifts to Step S207, the surveying instrument 2 displays the landscape image acquired in Step S201 on the display unit 15, and displays the data of the measurement points acquired in Step S202 and the scanning range set in Step S206 superimposed on the image.

Next, the process shifts to Step S208, and it is confirmed with the user whether to start scanning based on the set scanning range. When the user's answer is "Yes," the scanning range is decided, and the process shifts to Step S209 and scanning is started. When the user's answer is "No," the process shifts to Step S210, and the user manually sets a scanning range, and the scanning range is confirmed, and then, the process shifts to Step S209 and scanning is started.

When scanning of the set scanning range is completed, the process shifts to Step S211 and scanning is ended, and the data storage unit 39 stores obtained point group data.

In the survey system 201 according to the present embodiment, a three-dimensional model is also created in the same manner as in the first and second embodiments.

When a surrounding landscape image is acquired by using the camera 50 and superimposed on image data so that the automatically set scanning range 40 can be confirmed as described above, the scanning range 40 can be visually confirmed, and this is convenient. Even in this case, setting itself of the scanning range 40 is automatically performed, so that the area 42 including all required measurement points can be reliably specified.

Figure 12A:
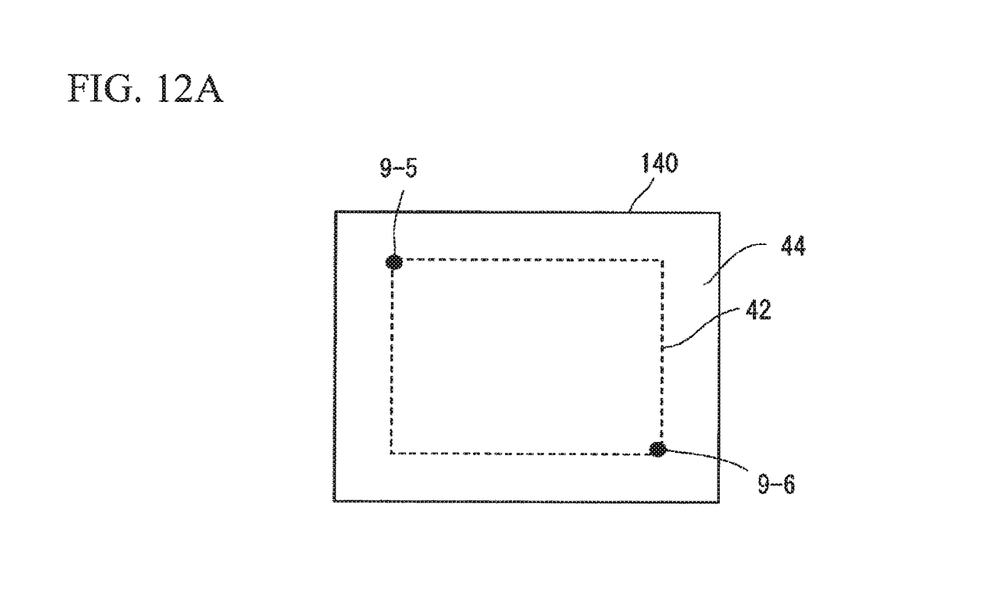
FIG. 12A and FIG. 12B are views illustrating examples of a scanning range setting by use of different numbers of measurement points.
Figure 12B:
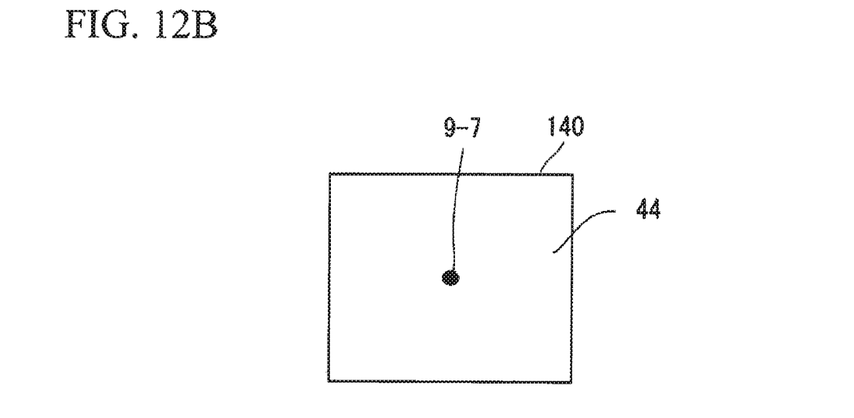

The number of measurement points is not limited to the examples described above. FIGS. 12A and 12B illustrate an example in which a scanning range 140 is set with the number of measurement points changed by using the survey system according to the second embodiment, and FIG. 12A illustrates an example in which a scanning range is set by using two measurement points 9-5 and 9-6, and FIG. 12B illustrates an example in which a scanning range is set by using one measurement point 9-7. In this way, the scanning range 40, 140 can be set by using data of an arbitrary number of measurement points that is at least one, and the number of measurement points is preferably 2 to 4.

While preferred embodiments of the present invention are described above, the embodiments described above are examples of the present invention, and can be combined based on knowledge of a person skilled in the art, and such combination modes are also included in the scope of the present invention.

REFERENCE SIGNS LIST

1, 101, 201 Survey system
2 Surveying instrument
15 Display unit
22, 222 Scanner
39 Data storage unit
50 Camera
9-1, 9-2, 9-3, 9-4, . . . , 9-n Measurement point
40, 140 Scanning range
44 Enlarged scanning range

What is claimed is:

1. A scanning range setting method using a surveying instrument configured to measure a distance to a measurement point by using a distance measuring light and measure an angle to the measurement point, and a scanner configured to scan with a scanning light around rotation axes in a horizontal direction and a vertical direction to acquire three-dimensional point group data, comprising steps of:
   (A) measuring distances and angles to two or more measurement points by the surveying instrument;
   (B) storing coordinates and angles of the measurement points;
   (C) setting a scanning range with a horizontal scanning angle defined by defining a first any-one arbitrary point of the measuring points along a line that defines the extreme horizontal scan angle and defining a second any-one arbitrary point of the measuring points that defines the other extreme horizontal scan angle and a vertical scanning angle defined by defining a first any-one arbitrary point of the measuring points along a line that defines one extreme vertical scan angle and defining a second any-one arbitrary point of the measuring points along a line that defines the other extreme vertical scan angle; and
   (D) scanning the scanning range by the scanner, wherein a coordinate system of the scanner and a coordinate system of the surveying instrument match each other, and the coordinates of the measurement points are merged with three-dimensional point group data acquired by the scanner to create a three-dimensional model.

2. The method according to claim 1, wherein the scanning range further includes an enlarged scanning range that enlarges the scanning range by a predetermined range in at least one of the horizontal and vertical directions.

3. The method according to claim 2, further comprising: after the step (C),
   a step of displaying the scanning range by superimposing the scanning range on a landscape image acquired by using a camera.

4. The method according to claim 1, further comprising: after the step (C),
   a step of displaying the scanning range by superimposing the scanning range on a landscape image acquired by using a camera.

5. The method according to claim 1, wherein at least three or more measurement points are measured by the surveying instrument.

6. A survey system comprising:
   a surveying instrument configured to measure a distance to two or more measurement points by using a distance measuring light and measure angles to the measurement points; and
   a scanner configured to scan with a scanning light around rotation axes in a horizontal direction and a vertical direction to acquire three-dimensional point group data, wherein
   the scanner includes a data storage unit configured to store coordinates and angles of the measurement points, and is configured to, based on the coordinates and angles of the measurement points stored, set a scanning range with a horizontal scanning angle defined by defining a first any-one arbitrary point of the measuring points along a line that defines the extreme horizontal scan angle and defining a second any-one arbitrary point of the measuring points that defines the other extreme horizontal scan angle and a vertical scanning angle defined by defining a first any-one arbitrary point of the measuring points along a line that defines one extreme vertical scan angle and defining a second any-one arbitrary point of the measuring points along a line that defines the other extreme vertical scan angle.

7. The survey system according to claim 6, comprising:
a camera configured to photograph a landscape image including the measurement points, wherein
the surveying instrument includes a display unit configured to display the coordinates of the measurement points and the landscape image, and
the display unit is configured to display the scanning range by superimposing the scanning range on the landscape image.

8. The survey system according to claim 6, wherein at least three or more measurement points are measured by the surveying instrument.

9. A scanning range setting method using a surveying instrument configured to measure a distance to a measurement point by using a distance measuring light and measure an angle to the measurement point, and a scanner configured to scan with a scanning light around rotation axes in a horizontal direction and a vertical direction to acquire three-dimensional point group data, comprising steps of:

(A) measuring distances and angles to two or more measurement points by the surveying instrument;

(B) storing coordinates and angles of the measurement points;

(C) setting a rectangular area whose horizontal length is defined by a range of a horizontal included angle of two points most distant from each other in the horizontal direction among the two or more measurement points and whose vertical length is defined by a range of a vertical included angle of two points most distant from each other in the vertical direction among the two or more measurement points as a scanning range by the scanner, the area including all of the measurement points; and (D) scanning the scanning range by the scanner, wherein a coordinate system of the scanner and a coordinate system of the surveying instrument match each other, and the coordinates of the measurement points are merged with three-dimensional point group data acquired by the scanner to create a three-dimensional model.

* * * * *